(12) United States Patent
Sawatzki et al.

(10) Patent No.: US 10,800,244 B2
(45) Date of Patent: Oct. 13, 2020

(54) MOTOR VEHICLE BATTERY ARRANGED ON A REAR FLOOR

(71) Applicant: FORD GLOBAL TECHNOLOGIES, LLC, Dearborn, MI (US)

(72) Inventors: Marius Sawatzki, Pulheim (DE); Hauke Weber, Cologne (DE); Jozsef Toth, Cologne (DE); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/109,389

(22) Filed: Aug. 22, 2018

(65) Prior Publication Data
US 2019/0061508 A1 Feb. 28, 2019

(30) Foreign Application Priority Data

Aug. 30, 2017 (DE) .................. 10 2017 215 113

(51) Int. Cl.
B60R 16/04 (2006.01)
B60K 1/04 (2019.01)
B60K 13/04 (2006.01)
F01N 13/00 (2010.01)

(52) U.S. Cl.
CPC ............. B60K 1/04 (2013.01); B60K 13/04 (2013.01); F01N 13/008 (2013.01); B60K 2001/0416 (2013.01); B60K 2001/0438 (2013.01); B60Y 2306/01 (2013.01); F01N 2590/11 (2013.01)

(58) Field of Classification Search
CPC .... B60K 1/04; B60K 1/00; B60K 2001/0438; B60K 2001/0416; B60K 13/04; B60R 16/04; F01N 13/008; F01N 13/00; F01N 2590/11
See application file for complete search history.

(56) References Cited

U.S. PATENT DOCUMENTS

| 8,511,412 | B2* | 8/2013 | Kawaguchi | ......... H01M 2/1083 180/68.5 |
| 8,567,543 | B2* | 10/2013 | Kubota | .................. B60L 50/64 180/68.5 |
| 8,631,886 | B2* | 1/2014 | Kawamura | .............. B60K 5/04 180/65.22 |

(Continued)

FOREIGN PATENT DOCUMENTS

DE 102015205255 A1 10/2015
JP 2015000615 A 1/2015

Primary Examiner — James M Dolak
(74) Attorney, Agent, or Firm — Frank MacKenzie; Brooks Kushman P.C.

(57) ABSTRACT

The disclosure concerns a motor vehicle with an exhaust silencer arranged at a rear axle. At least one battery receptacle is arranged adjacent to and at least partially at a side and/or rear of the vehicle component on a rear floor, and formed as a tray. At least one battery is arranged at least partially in the battery receptacle. At least one deflector element is arranged between the battery receptacle and the vehicle component. And the deflector element is configured such that the vehicle component, standing in contact with the deflector element due to a sideways and/or forward displacement of the vehicle component, is pressed downward by the exhaust silencer in a floor direction.

15 Claims, 8 Drawing Sheets

(56) References Cited

U.S. PATENT DOCUMENTS

| | | | | |
|---|---|---|---|---|
| 8,708,401 B2* | 4/2014 | Lee | ............... | B62D 21/152 |
| | | | | 280/124.109 |
| 8,820,455 B2* | 9/2014 | Nitawaki | ............ | B60L 11/1874 |
| | | | | 180/68.5 |
| 8,905,171 B2* | 12/2014 | Lee | ............ | B60K 1/04 |
| | | | | 180/68.5 |
| 9,308,805 B2* | 4/2016 | Shiromura | ............... | B60K 1/04 |
| 9,561,823 B2* | 2/2017 | Eberle | ............... | B62D 21/152 |
| 9,590,216 B2* | 3/2017 | Maguire | ............ | H01M 2/1083 |
| 9,981,541 B2* | 5/2018 | Onodera | ............ | B60K 1/04 |
| 10,293,697 B2* | 5/2019 | Goitsuka | ............ | B60K 1/04 |
| 10,322,757 B2* | 6/2019 | Shimoda | ............ | B62D 25/20 |
| 10,367,377 B2* | 7/2019 | Yuasa | ............ | B60L 53/36 |
| 10,468,645 B2* | 11/2019 | Jackson | ............ | H01M 10/6556 |
| 10,583,714 B2* | 3/2020 | Ogawa | ............ | B60H 1/004 |
| 10,632,830 B2* | 4/2020 | Sugizaki | ............ | B60L 3/0007 |
| 10,632,857 B2* | 4/2020 | Matecki | ............ | B60K 1/04 |
| 10,654,431 B2* | 5/2020 | Ito | ............ | H01M 2/1083 |

* cited by examiner

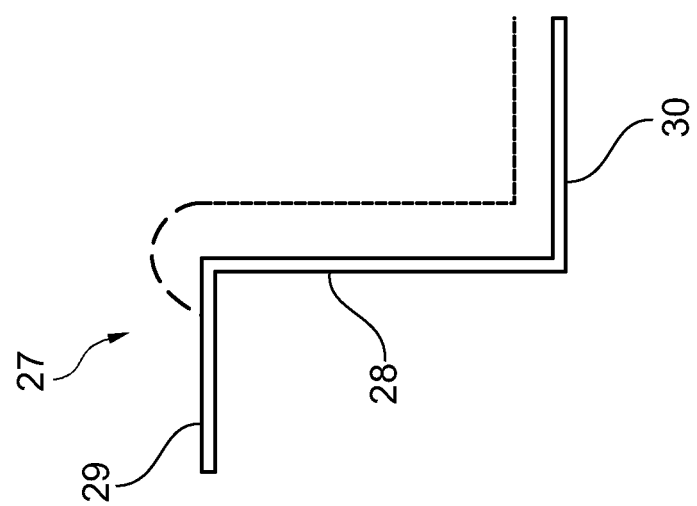

MOTOR VEHICLE BATTERY ARRANGED ON A REAR FLOOR

CROSS-REFERENCE TO RELATED APPLICATIONS

This application claims foreign priority benefits under 35 U.S.C. § 119(a)-(d) to DE Application 10 2017 215 113.7 filed Aug. 30, 2017, which is hereby incorporated by reference in its entirety.

TECHNICAL FIELD

The disclosure concerns a motor vehicle with a battery arranged adjacent to an exhaust silencer on a rear floor.

BACKGROUND

A motor vehicle may have a combustion machine that comprises inter alia an internal combustion engine and an exhaust system discharging exhaust gas from the internal combustion engine. To reduce sound emissions from the internal combustion engine, the exhaust system normally comprises at least one exhaust silencer, which is arranged to a rear of a rear axle of the motor vehicle below a rear floor of the motor vehicle.

Vehicle constructions are known in which, inter alia, a battery formed from several electrochemical cells is arranged at least partially in a battery receptacle, arranged at least partially between the rear axle and the exhaust silencer, on a rear floor and formed as a tray, wherein the battery receptacle may be formed on a floor of a spare wheel receptacle formed on the rear floor.

On a rear-end collision of such a motor vehicle with an object, a plastic deformation of rear components of the motor vehicle may occur, in particular bodywork components or the rear floor. A physical contact between the plastically deformed components and the exhaust silencer may, during collision, cause the exhaust silencer to be displaced forward in a direction of the battery receptacle, and come into physical contact with the battery receptacle, whereby the battery receptacle may also be plastically deformed. In particular, it may occur that the battery receptacle is displaced forward and becomes trapped between the rear axle and the exhaust silencer, and hence plastically deformed.

Due to plastic deformation of the battery receptacle, the battery may become trapped and damaged, which for safety reasons must be absolutely avoided. Also, in the case of a rear-end collision, a spare wheel arranged above the battery may, for example due to spare wheel displacement, press on the battery from above, and damage the battery. Furthermore, due to a higher axial load on the rear axle, the rear axle may be arranged more closely to the vehicle floor, which further adversely affects a component situation in a rear sector, and can promote the above-mentioned trapping of the battery receptacle between the rear axle and the exhaust silencer. Furthermore, due to displacement of components relative to each other, contact can occur between hot components of the exhaust system and the battery, for example a lithium-ion battery, or other highly flammable components or materials. These processes mean that desired and/or specified safety objectives cannot be achieved.

SUMMARY

The disclosure is based on the object of providing a motor vehicle with a rear structure which is improved in relation to safety aspects.

According to the disclosure, the object is achieved by a motor vehicle, which comprises at least one deflector element which is arranged between a battery receptacle and a vehicle component, and configured such that the vehicle component, standing in contact with a deflector element due to a sideways and/or forward displacement of the vehicle component, is pressed downward by said element in a direction of ground on further sideways or forward displacement.

It is pointed out that the features and measures listed individually in the description below may be combined with each other in any technically sensible fashion and disclosure further embodiments of the disclosure. The description characterizes and specifies the disclosure further, in particular in connection with the Figures.

A rear-end collision in a sense of the disclosure means any impact on a rear, also including a lateral component. A forward displacement in the sense of the disclosure means a displacement along a longitudinal axis of a vehicle in a direction towards a vehicle front, wherein movement travel may also have a component oriented transversely to the longitudinal axis.

The vehicle component may be an exhaust component, in particular an exhaust silencer, without the disclosure being restricted to an exhaust silencer. An exhaust component may also be merely a pipe portion of an exhaust, or another component, such as for example an exhaust after-treatment system or another component arranged in the exhaust pipe. Alternatively, the vehicle component may be a spare wheel mounted on an underfloor. The vehicle component may be offset partially, or completely to a side and/or rear in relation to a battery receptacle.

If the motor vehicle according to the disclosure is involved in a rear-end collision with an object, for example from a vehicle impact at the rear, an exhaust silencer arranged at the rear relative to the battery receptacle, or a correspondingly arranged spare wheel, may be displaced forward in a direction of the battery receptacle. Beyond a specific displacement travel, a physical contact occurs between the forward, displaced, exhaust silencer, or spare wheel, and a deflector element arranged between the exhaust silencer, or spare wheel, on one side and the battery receptacle on the other. On a further, forward displacement of the exhaust silencer, or spare wheel, in a vehicle longitudinal direction, the exhaust silencer or spare wheel is pressed downward by the deflector element in a direction of a ground or road surface, and thereby deflected from a movement path in the direction of the battery receptacle. Thus, the exhaust silencer or spare wheel can be reliably prevented from coming into physical contact with the battery receptacle during a rear-end collision, whereby the battery receptacle could be plastically deformed, and the battery damaged. Thus, the battery receptacle, which may have been displaced forward in a collision and thus stand in physical contact with a rear axle, may also be prevented from being trapped between the rear axle and the exhaust silencer or spare wheel, and thereby being further plastically deformed. Also, due to deflection of the exhaust silencer or spare wheel in an event of a collision, an additional vehicle portion is exposed for absorption of impact energy by deformation of vehicle components, whereby accident properties of the motor vehicle are improved. Consequently, the motor vehicle according to the disclosure has a rear structure, which is improved in relation to safety aspects.

If the motor vehicle according to the disclosure is involved in a rear side collision with an object, for example from a vehicle impact from a side, an exhaust pipe may be arranged at the side—on an impact side—relative to the battery receptacle or an exhaust silencer arranged at the side of the battery receptacle is displaced sideways in the direction of the battery receptacle. Beyond a specific displacement travel, a physical contact occurs between the sideways, displaced, exhaust pipe or exhaust silencer, and the deflector element arranged between the exhaust pipe or exhaust silencer and the battery receiver. On a further sideways displacement of the exhaust pipe or exhaust silencer in a vehicle transverse direction, the exhaust pipe or exhaust silencer is pressed downward by the deflector element in the direction of the ground or road surface, and thereby deflected from a movement path in the direction of the battery receptacle. Thus, the exhaust pipe or exhaust silencer can be reliably prevented from coming into physical contact with the battery receptacle on a rear side collision, whereby the battery receptacle could be plastically deformed and the battery damaged. Also, due to deflection of the exhaust pipe or exhaust silencer in an event of a collision, an additional vehicle portion is exposed for absorption of impact energy by deformation of vehicle components, whereby accident properties of the motor vehicle are improved. Consequently, the motor vehicle according to the disclosure has a rear structure, which is improved in relation to safety aspects.

The deflector element may be made of a plastic, a composite material, in particular a fiber composite material, a metal or a metal alloy, in particular steel. The deflector element may be produced as a sheet metal part using a punching process or using a 3-D printing process. In addition, the deflector elements may also be integrated in a battery tray or rear floor, which is made of plastic or SMC. The deflector element may have at least one linear or curved contact face along which the vehicle component may be guided, in the event of a collision. Portions of this contact face are preferably arranged closer to the battery receptacle, the further the portions of the contact face are distanced from the rear floor of the motor vehicle. At the floor, the deflector element may be fixed to the rear floor of the motor vehicle. Alternatively, or additionally, the deflector element may be fixed to the battery receptacle at the side, or rear. Alternatively, the deflector element may be arranged spaced to the side, or rear, relative to the battery receptacle. The deflector element may comprise angled portions, and/or beading in order to increase an inherent stability of the deflector element with minimum material usage. The deflector element preferably extends up to a lower end of the battery receptacle on a floor side. The motor vehicle may have two, three, four or more corresponding deflector elements, which are preferably arranged spaced apart from each other in the vehicle longitudinal direction or vehicle transverse direction. On the other side, such deflector elements may also be arranged on the vehicle component, and/or the vehicle component may have a special form that facilitates a sliding along the deflector elements, for example an added integral chamfer on the rear or a rounded, for example oval form.

The motor vehicle may for example be a car or a truck. In particular, the motor vehicle may have a conventional drive formed solely by an internal combustion engine, or an electric, hybrid drive, or exclusively an electric drive. The rear axle of the motor vehicle may for example be configured as a multi-link axle. An exhaust silencer arranged to the rear relative to the battery receptacle may extend in a vehicle transverse direction. The battery may be used to supply electrical power to vehicle electrics. Alternatively, or additionally, the battery may serve as a traction battery. The battery preferably comprises several electrochemical cells connected together electrically, in particular lithium-ion cells.

According to an advantageous embodiment, the deflector element comprises a triangular rib that extends parallel or transversely to a vehicle longitudinal direction, and tapers in the direction of the ground. A rib here means a component that is thin relative to a component longitudinal extension. Such a deflector element, because of low physical complexity, can be produced easily and economically. Due to a rectilinear, or curved, taper of the rib, a sloping contact face is provided along which the vehicle component can slide in the direction of the ground during a rear-end collision, in order to deflect the vehicle component. Preferably, the rib is formed as a right-angled triangle. Here, the deflector element may be arranged such that a longest edge face of the deflector element is used as a contact face for contact with the vehicle component. The contact face of the rib for contact with the vehicle component may be arranged sloping at an angle, which is optimized in relation to a respective shape of the vehicle component and deflection properties of the deflector element. The rib may also have other forms. For example, the contact face of the rib formed as a right-angled triangle may also be formed concavely or convexly, and adapted individually to geometry of the vehicle component making contact therewith. It is also possible for the rib to be formed as a trapezoid quadrangle, wherein a lower web of the rib in the longitudinal direction is selected significantly shorter than an upper web, in order to guarantee a deflection function of the rib. In this way, a greater distance from the vehicle component in the vehicle longitudinal axis could be bridged if necessary.

A further advantageous embodiment provides that a part of the deflector element coming into contact with the vehicle component is formed flat. In this way, a sharp or acute linear contact between the deflector element and the vehicle component is avoided, which for example prevents an exhaust silencer from being cut open by the deflector element in an event of a collision, and obstructing sliding of the exhaust silencer due to increased friction or catching. A flat formation of a part of the deflector element that comes into contact with the vehicle component in the event of a collision may be achieved by an angling of the deflector element, a thickening of the deflector element or similar.

According to a further advantageous embodiment, at least one surface of the vehicle component intended for contact with the deflector element is formed rounded or chamfered. In this way, the deflection behavior of the vehicle component is improved in order to ensure that, without great force usage and catching in any way on the deflector element, the vehicle component can slide downward along the deflector element in the direction of the ground. In the case of a chamfered contact face of the vehicle component, the chamfered contact face may for example be configured to be complementary to a contact face of the deflector element coming into contact therewith.

According to a further advantageous embodiment, the deflector element is arranged spaced to the side or rear from, or in contact with, the battery receptacle. The arrangement of the deflector element spaced to the side and/or rear from the battery receptacle serves to prevent, as far as possible, a load transfer from the deflector element to the battery receptacle, and hence finally also to the battery. By contact between the deflector element and battery receptacle, the deflector element may be supported at the side or front on the battery receptacle, whereby a more robust assembly is created. Also, the deflector element in contact with the battery receptacle may be fixed to the battery receptacle, in order to further increase robustness of a resulting assembly.

A further advantageous embodiment provides that the motor vehicle comprises at least one holding unit, holding a battery at least partially in the battery receptacle and comprising two H-shaped holding clamps, which are arranged on a side of the battery relative to the vehicle transverse direction, and via which the holding unit is attached to the rear floor. The holding unit may surround the battery completely or partially. The holding unit may be formed from individual holding elements connected together to form a lightweight holding structure. The holding unit together with the battery may form a substantially undeformable assembly. The holding unit may be made partially or completely of a metal, a metal alloy, a composite material or a plastic. By means of the holding unit, in normal operation of the motor vehicle, the battery is held securely and in a correct position in the battery receptacle. By choice of a specific material for the holding clamps, for example a metal, metal alloy or a plastic, deformation properties of the holding unit may be adapted to the respective requirements. The holding unit may also be mounted below the vehicle, rotated by 90°, and arranged with the holding clamps on the side of the battery relative to the vehicle longitudinal direction.

Each H-shaped holding clamp of the holding structure comprises two vertical elements that, at vertical element upper ends, via fixing tabs arranged at an angle thereto, are fixed at least indirectly on the rear floor, and a horizontal web running transversely to the elements and connecting the elements together centrally, on which the battery may be attached.

If, for example, a rear, vertical element of the respective, H-shaped, holding clamp is mechanically loaded in the case of a rear-end collision and/or an associated plastic deformation of the battery receptacle, the rear element may in particular be elastically deformed and displaced partially forwards away from a rear element fixing point on the rear floor. Thus, the rear element, via the web, at the same time also pushes a front element partially forward accordingly and deforms the front element, in particular elastically. Consequently, the battery can be displaced forward by the H-shaped, holding clamps or the holding structure, and at the same time raised in order to be able to deflect forward and upward at least partially, thus avoiding a rear-end, mechanical load of the battery due to physical contact with a rear portion of the battery receptacle, without damage to the battery. It is suitable if the battery is connected to the holding unit inseparably, i.e. the respective holding clamp (swing), so that the battery is not unsecured at any time. Thus, a relative shift towards the holding clamps is avoided, in order to prevent loads on the battery and/or a catching of the battery against surrounding components. The holding clamp fulfils this task as an enduring battery receptacle, since this does not fail despite deformation. The battery is not raised out of the battery receptacle, but merely out of the floor tray. Depending on the surrounding components, evidently a slight shift of the battery relative to the holding clamps may be permitted, which however can be established individually. In the ideal configuration, the battery connection to the holding clamps should however be regarded as inseparable. By deflection of the battery, an additional vehicle portion is exposed for absorption of impact energy, which further improves the accident properties of the motor vehicle.

The forward displacement and raising of the battery as described is advantageous, in particular if a rear-end collision takes place such that the vehicle component comes into contact with a lower portion of the battery receptacle, since in this way the battery receptacle is deformed plastically, in particular in a floor region, whereby in turn a force is exerted on a lower free end of the rear element of each holding clamp. Because of a resulting strong lever effect, the holding clamps are deformed optimally as described above.

If the rear-end mechanical loading on the holding clamps is removed again, for example by dismantling of the vehicle component and processing of the battery receptacle, the vertical elements of the holding clamps may automatically, because of holding clamp internal return forces, move back to holding clamp undeformed states if they have been exclusively elastically deformed during the collision. Thus, the battery is mounted on the rear floor via the holding unit so as to oscillate to a certain extent in the vehicle longitudinal direction. The holding unit may be configured and arranged such that the battery, in particular under high rear-end mechanical loads, can be pivoted into a position in which the battery sits completely above the rear axle. In this way, a further, rear, mechanical loading on the holding unit and battery can be reduced or prevented. Also, in this way an additional portion may be exposed for absorption of impact energy, in order to further improve the accident properties of the motor vehicle.

According to a further advantageous embodiment, the holding clamps are attached to the rear floor via fixing points that can be varied in the vehicle longitudinal direction and/or in the vehicle transverse direction. In this way, the holding clamps or the holding unit, on a rear-end collision, may additionally be moved forward or to the side by a specific extent in order to prevent a high mechanical loading on the battery. In this way too, an additional portion can be exposed for absorption of impact energy, in order to further improve the accident properties of the motor vehicle. It may be provided that, in a rear-end collision, the holding unit is first moved forward or to the side, and if necessary, following this displacement, pivoted forward or to the side and simultaneously upward by the above-mentioned holding clamps.

According to a further advantageous embodiment, the motor vehicle comprises at least one support element that is arranged between the battery and a spare wheel arranged on or above the rear floor, and to which the holding unit is attached. In this way, in the event of a collision, a direct, physical contact between the battery and spare wheel—displaced relative to the battery during the collision—can be reliably avoided. Instead, mechanical loads are transmitted from the spare wheel to the battery exclusively via a supporting element. The supporting element may be configured such that the supporting element does not obstruct an above-mentioned displacement or pivoting of the battery by the holding clamps in the event of a collision. The supporting element may be made of a metal, a metal alloy, a plastic or a composite material. The supporting element may be formed as sheet metal strips with angled portions running in opposing directions at the ends. The supporting element may be produced by a 3-D printing process with corresponding materials. Alternatively, the supporting element may be formed from individual parts connected together, for example glued together. The motor vehicle may also have two or more corresponding supporting elements.

In a further advantageous embodiment, the support element is formed Z-shaped. The Z-shaped support element may have two, mutually opposing legs, each protruding at a right angle from a center part. A leg arranged facing the battery may be attached to the holding unit on the rear.

The Drawings Show:

BRIEF DESCRIPTION OF THE DRAWINGS

FIG. 8 is a diagrammatic, side view of the support element shown in FIG. 4 in an undeformed state, and in a deformed state.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, the same parts always carry the same reference signs so these are usually only described once.

Figure 1:
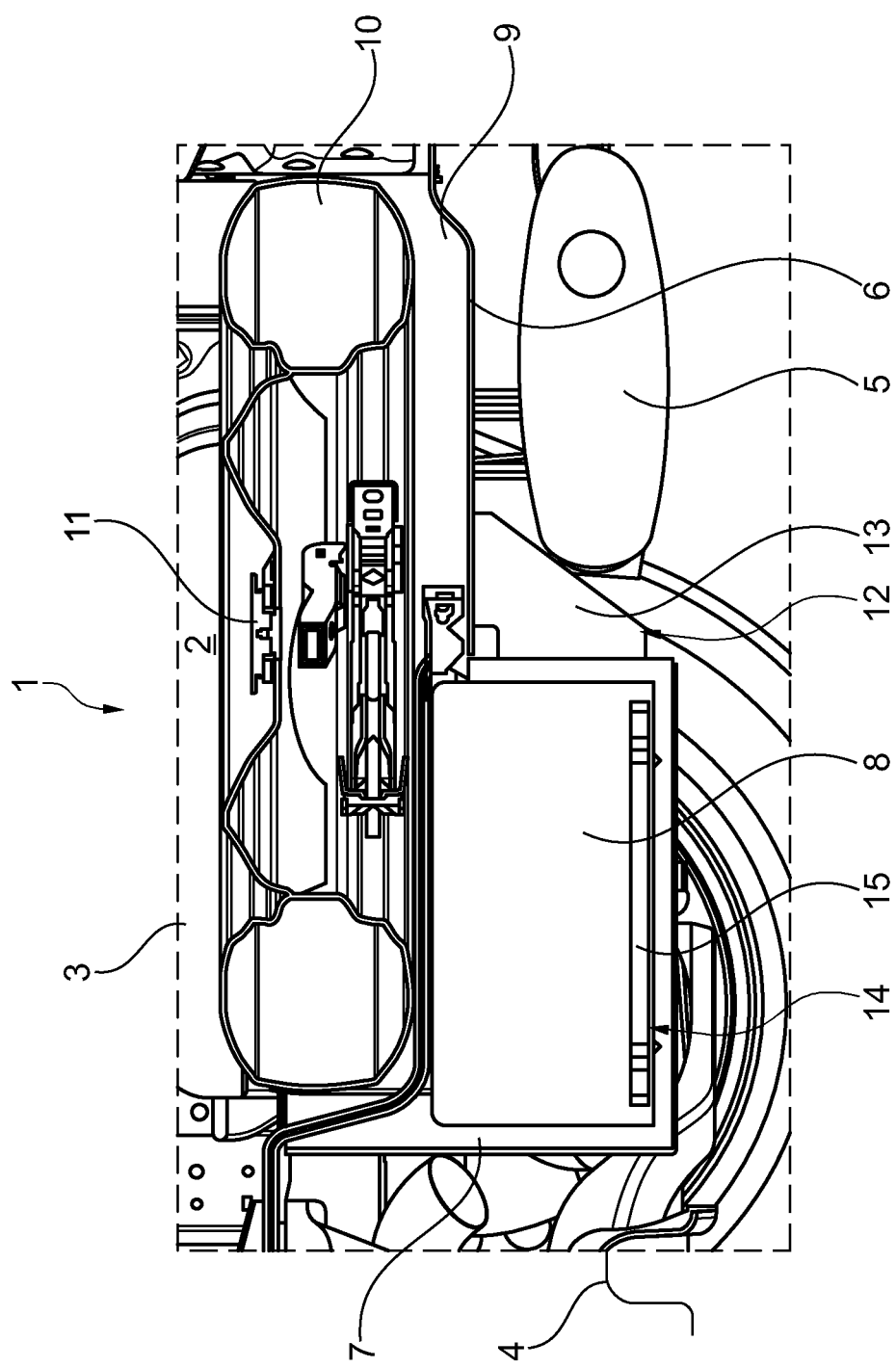
FIG. 1 is a diagrammatic, sectional view of an exemplary embodiment of a motor vehicle according to the disclosure.

FIG. 1 shows a diagrammatic, sectional view of an exemplary embodiment of a motor vehicle 1 according to the disclosure, wherein FIG. 1 shows, in longitudinal section, only a lower rear portion in a region of a luggage compartment 2 of the motor vehicle 1.

The motor vehicle 1 has a spring mass 3 that, in the rear portion shown, is sprung relative to a rear axle 4 of the motor vehicle 1. Furthermore, the motor vehicle 1 has a vehicle component 5, in the form of an exhaust component, in particular an exhaust silencer, arranged at a rear of the rear axle 4. Also, the motor vehicle 1 has a battery receptacle 7 in the form of a tray, arranged partially between the rear axle 4 and the vehicle component 5 on a rear floor 6 of the motor vehicle 1. The motor vehicle 1 furthermore has a battery 8 partially arranged in the battery receptacle 7. On the rear floor 6 delimiting a floor of the luggage compartment 2, a spare wheel receptacle 9 is formed in which a spare wheel 10 may be partially arranged and fixed via fixing means 11.

Figure 2:
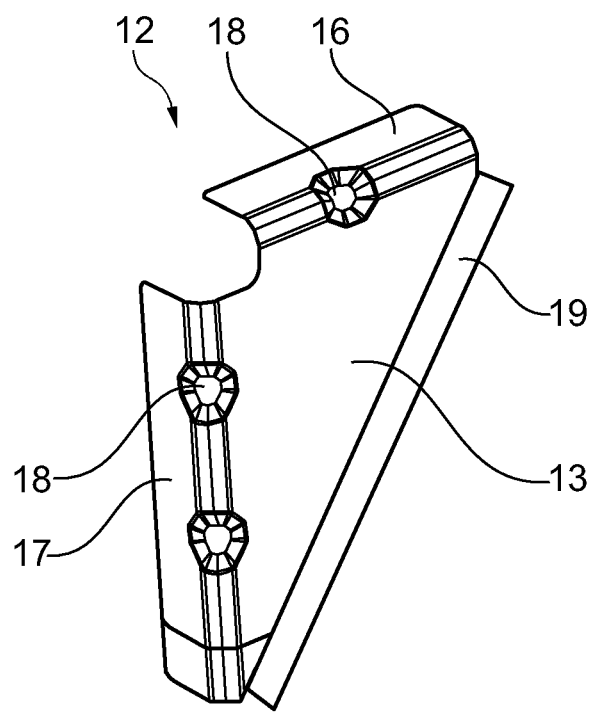
FIG. 2 is a diagrammatic, perspective view of a deflecting element shown in FIG. 1.
Figure 3:
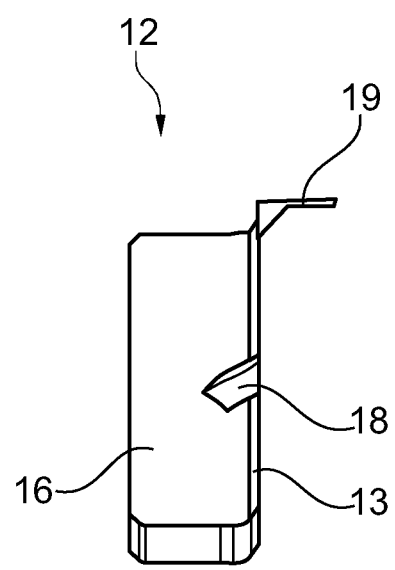
FIG. 3 is a further diagrammatic, perspective view of the deflecting element shown in FIG. 1.

Furthermore, the motor vehicle 1 comprises three deflector elements 12 that are spaced apart from each other in a vehicle transverse direction, and arranged between the battery receptacle 7 and the vehicle component 5, and of which FIG. 1 shows only one deflector element 1; the deflector elements are each configured such that a respective deflector element 12 presses the vehicle component 5, which is in contact with the respective deflector element 12 under a forward displacement of the vehicle component 5, downward in a direction of the ground on a continued forward displacement. For this, each deflector element 12 comprises a triangular rib 13 that extends parallel to a vehicle longitudinal direction, and tapers in the direction of the ground. Such a deflector element 12 is shown in FIGS. 2 and 3 from various perspectives, wherein FIGS. 2 and 3 show in particular that a part of the deflector element 12 coming into contact with the vehicle component 5 is formed flat. FIG. 1 furthermore shows that a surface of the vehicle component 5 intended for contact with the respective deflector element 12, i.e. the surface of the vehicle component 5 shown on a left in FIG. 1, is formed rounded. Alternatively, this surface may be chamfered in a manner complementary to the chamfer shown of the respective deflector element 12. Each deflector element 12 is arranged in contact with the rear floor 6 and the battery receptacle 7, and may be fixed to the rear floor 6 and the battery receptacle 7. Alternatively, each deflector element 12 may be arranged spaced to the rear from the battery receptacle 7.

Figure 4:
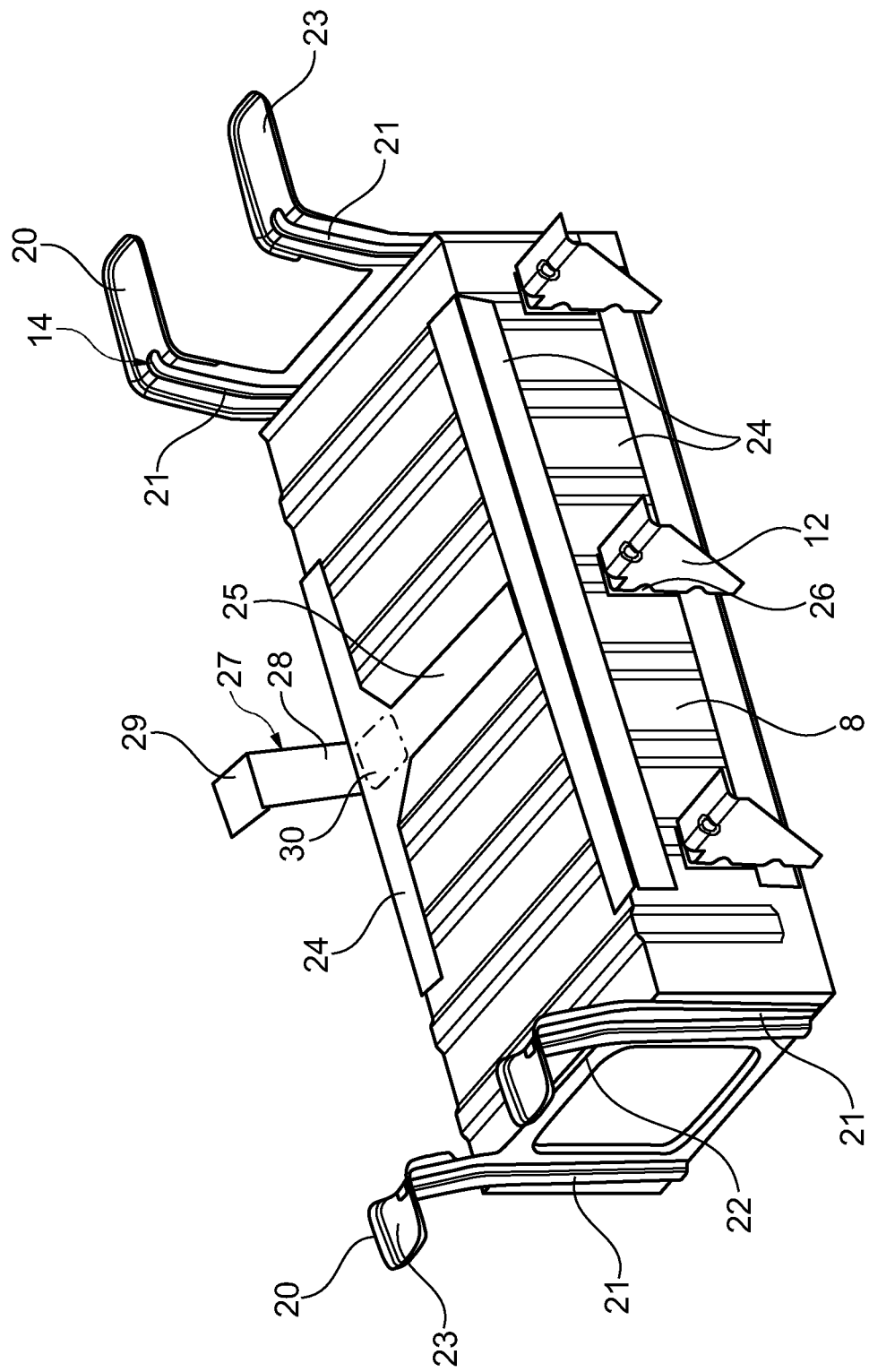
FIG. 4 is a diagrammatic, perspective view of a holding unit shown in FIG. 1 and a battery.
Figure 5:
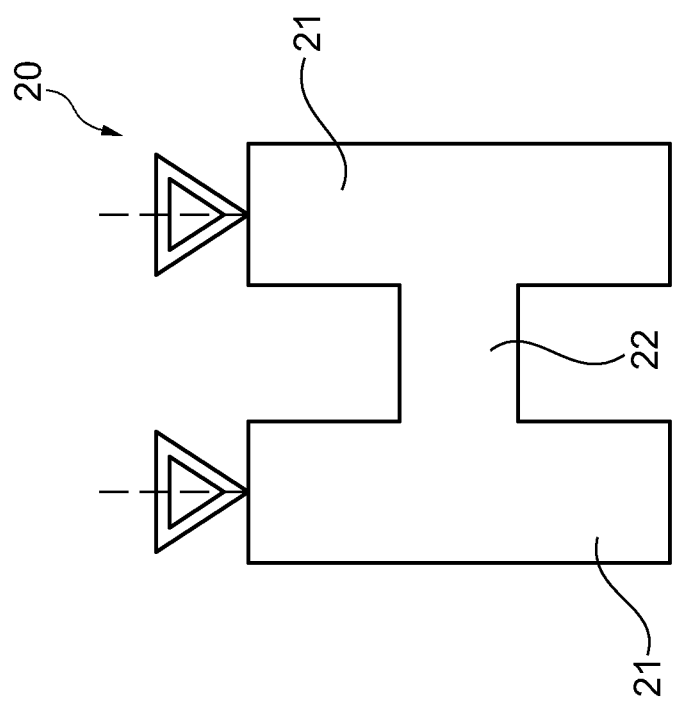
FIG. 5 is a diagrammatic view of a holding clamp of the holding unit shown in FIG. 4 in an undeformed state.
Figure 6:
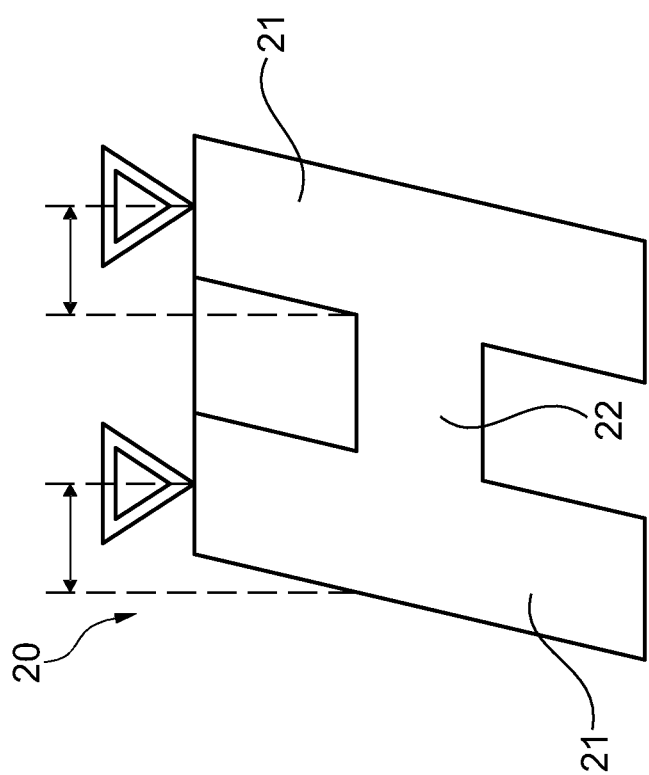
FIG. 6 is a diagrammatic view of a holding clamp of the holding unit shown in FIG. 4 in an undeformed state.

The motor vehicle 1 furthermore comprises a holding unit 14 holding the battery 8 partially in the battery receptacle 7, and comprising two H-shaped holding clamps, shown in FIGS. 4 to 6, which are arranged at a side of the battery 8 relative to a vehicle transverse direction running vertically to a drawing plane, and via which the holding unit 14 is attached to the rear floor 6. FIG. 1 shows only a floor-side holding element 15 of the holding unit 14. The holding clamps may also be attached to the rear floor 6 via fixing points (not shown) that are variable in the vehicle longitudinal direction. The battery 8 in an ideal configuration is inseparably connected to a respective holding clamp 20.

Furthermore, the motor vehicle 1 has a supporting element, shown in FIGS. 4 and 8, which is arranged between the battery 8 and the spare wheel 10 arranged on or above the rear floor 6, and which is attached to the holding unit 14. The supporting element is configured Z-shaped as shown in FIGS. 4 and 8.

FIG. 2 shows a diagrammatic, perspective view of a deflector element 12 shown in FIG. 1. The deflector element 12 comprises the rib 13 formed as a right-angled triangle. Angled portions 16 and 17 adjoin the rib 13 on both short sides thereof, and run at right angles to the rib 13, providing abutment surfaces or fixing surfaces for fixing the deflector element to the rear floor 6 shown in FIG. 1 and/or to the battery receptacle 7 shown in FIG. 1. A single depression 18 is arranged in a transition from the rib 13 to the angled portion 16, and two further depressions 18 are arranged spaced apart from each other in the transition from the rib 13 to the angled portion 17, increasing an inherent stability of the deflector element 12. An angled portion 19 is arranged on a longest side of the rib 13, whereby a part of the deflector element 12, which comes into contact with the vehicle component 5 shown in FIG. 1 on a rear-end collision, is formed flat. The angled portion 19 may be produced as one piece with the rib 13. Alternatively, the angled portion 19 may be produced separately and connected to the rib 13 by substance bonding.

FIG. 3 shows a further diagrammatic, perspective view of the deflector element 12 shown in FIG. 1. In this perspective, the angled portion 16 is shown obliquely from above, while a viewing direction is parallel to a longitudinal extension of the angled portion 19. To avoid repetition, reference is otherwise made to the description above for FIG. 2.

FIG. 4 shows a diagrammatic, perspective view of the holding unit 14 shown in FIG. 1 and the battery 8 the holding unit 14 holds. FIG. 4 also shows three deflector elements 12 arranged spaced apart from each other in a vehicle transverse direction, for the description of which reference is made to the above description of FIGS. 1 to 3.

The H-shaped holding clamps 20 of the holding unit 14 are shown, which are arranged on a side of the battery 8 relative to the vehicle transverse direction. Each holding clamp 20 comprises two vertical holding elements 21 running parallel to each other, with a web 22 connecting the two holding elements 21 together approximately, centrally. At an upper end of each holding element 21 is a tab-like angled portion 23, via which the respective holding clamp 20 is fixed to the rear floor 6 shown in FIG. 1.

Furthermore, the holding unit 14 has reinforcing longitudinal elements 24 arranged on the long sides of the battery 8, and reinforcing connecting elements 25 and 26 arranged roughly, centrally on the battery 8, via which the longitudinal elements 24 are connected together. In this way, an assembly formed from the holding unit 14 and battery 8 is substantially undeformable.

The Z-shaped supporting element 27 is fixed on a longitudinal element 24 and/or a connecting element 25, and via this element 27, mechanical loads in an event of a collision can be transmitted from the spare wheel 10 shown in FIG. 1 to the holding unit 14. The supporting element 27 comprises a vertical center part 28 or web, which connects together two, mutually opposing portions 29 and 30 of the supporting element 27, each angled at a right angle away from the center part 28. The portion 30 is fixed to the holding element 14, and is shown in dotted lines in the view in FIG. 4. A structure of the supporting element 27 is also shown in FIG. 8.

FIG. 5 shows a diagrammatic view of the holding clamp 20, shown on the left in FIG. 4, of the holding unit 14 shown in FIG. 4, in an undeformed state. This undeformed state of the holding clamp 20 exists in a normal state of the motor vehicle (not shown). The holding elements 21 of the holding clamp 20 are not deformed.

FIG. 6 shows a diagrammatic view of a holding clamp 20 of the holding unit 14, shown in FIG. 4, in a deformed state. A force acting from a right in FIG. 6 on a lower part of the holding clamp 20 deforms the holding element 21, shown on the right in FIG. 6, and hence necessarily, via the web 22, also the holding element 21 shown on the left in FIG. 6. In this way, the battery 8 connected to the holding clamp 20, shown in FIGS. 1 and 4, is displaced forward and upward.

Figure 7:
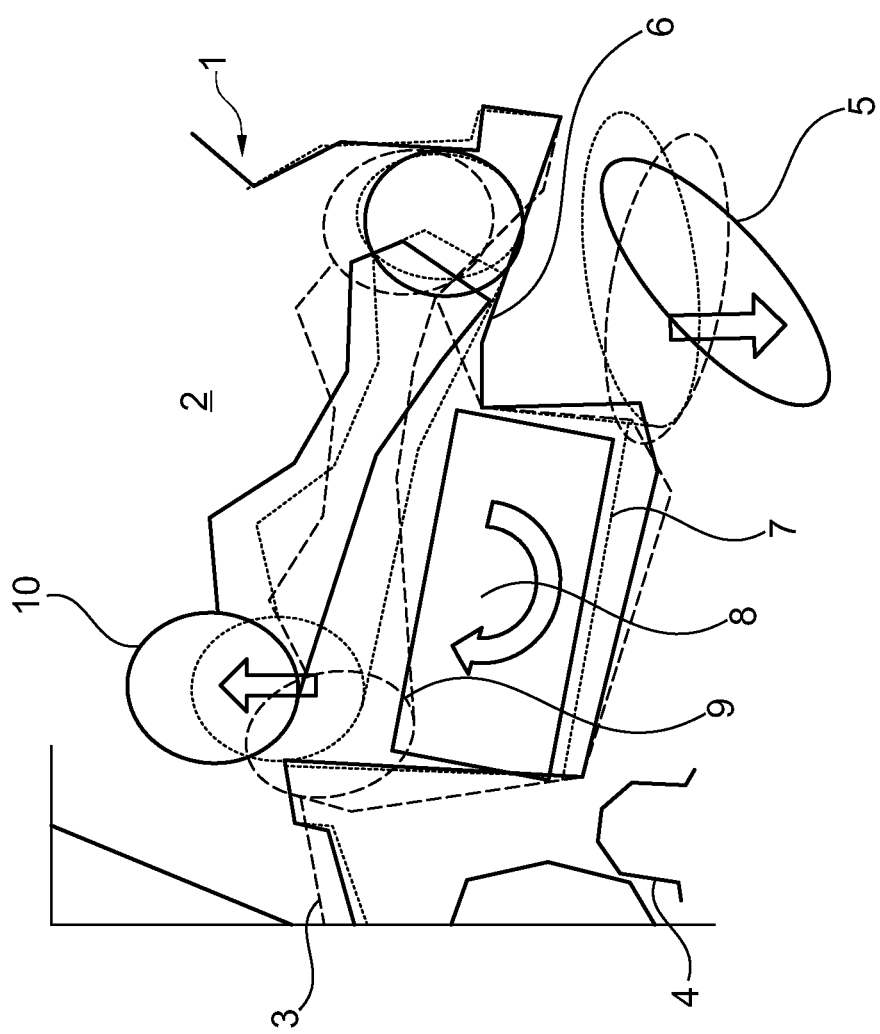
FIG. 7 is a diagrammatic, sectional view of the motor vehicle shown in FIG. 1 in four different states of deformation.

FIG. 7 shows a diagrammatic, sectional view of the motor vehicle 1 shown in FIG. 1, in four different states of deformation. It is evident that, on a rear-end collision, the vehicle component 5 in a form of an exhaust silencer is deflected downward in a direction of the ground by the deflector elements (not shown), and also rotated. It is also evident that the battery 8 is displaced or pivoted forward and upward during the collision.

FIG. 8 shows a diagrammatic side view of the supporting element 27 shown in FIG. 4 in the deformed state, as indicated by the dotted lines, and in the undeformed state, as indicated by the solid lines. The right-angled arrangement of the portions 29 and 30 relative to the center part 28, in undeformed state of the supporting element 27, can be seen. In the event of a collision, a vertical mechanical load can act on the supporting element 27, whereby the supporting element 27 may be deformed—as shown—without this restricting the above-mentioned pivotability of the battery shown in FIGS. 1, 4 and 7.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A motor vehicle comprising:
   a rear floor defining a spare tire receptacle;
   a battery assembly supported under the rear floor, the battery assembly including a battery disposed in a battery receptacle;
   a plurality of deflectors arranged on a rear side of the battery receptacle with the deflectors spaced apart from each other in a transverse direction of the motor vehicle, each of the deflectors including a triangular rib, a body tab formed on an upper horizontal edge of the rib, a battery tab formed on a forward vertical edge of the rib, and a deflector tab formed on a rear slanted edge of the rib, wherein the body tab is attached to the rear floor and the battery tab is attached to the battery assembly; and
   an exhaust including a silencer that is disposed adjacent to each of the deflectors, wherein the slanted edges of the ribs are configured to engage with the silencer, in the event of forward displacement of the silencer, and urge the silencer down and below the battery assembly to mitigate damage to the battery assembly.

2. The motor vehicle as claimed in claim 1, wherein the slanted edge tapers in a direction of ground.

3. The motor vehicle as claimed in claim 1, wherein the deflector tab is formed substantially flat.

4. The motor vehicle as claimed in claim 1, wherein the silencer includes a chamfered surface that faces the deflectors.

5. The motor vehicle as claimed in claim 1, wherein the plurality of deflectors includes three deflectors.

6. The motor vehicle as claimed in claim 1, wherein the battery assembly further includes at least one holding unit holding the battery at least partially in the battery receptacle with two, H-shaped, holding clamps arranged at a side of the battery relative to the transverse direction that attaches the holding unit to the rear floor.

7. The motor vehicle as claimed in claim 6, wherein the holding clamps are attached to the rear floor at fixing points that are varied in a longitudinal direction of the motor vehicle and in the transverse direction.

8. The motor vehicle as claimed in claim 6, wherein the battery is inseparably connected to the holding unit.

9. The motor vehicle as claimed in claim 6, wherein the battery assembly further includes at least one support element arranged between the battery and the spare tire receptacle, the support element being attached to the rear floor.

10. The motor vehicle as claimed in claim 9, wherein the support element is Z-shaped.

11. A motor vehicle comprising:
    a rear floor;
    an exhaust silencer arranged under the rear floor;
    at least one battery receptacle arranged under the rear floor and adjacent and forward of the exhaust silencer, the battery receptacle including:
    a tray,
    a plurality of deflectors arranged between the tray and the exhaust silencer, each of the deflectors including a triangular rib, a body tab formed on an upper horizontal edge of the rib and attached to the rear floor, a battery tab formed on a forward vertical edge of the rib and attached to the battery receptacle, and a deflector surface formed on a rear slanted edge of the rib, wherein the deflectors are configured to deflect the exhaust silencer down and below the tray to mitigate contact between the exhaust silencer and the battery receptacle, due to a sideways and forward displacement of the exhaust silencer, and a holder having two H-shaped holding clamps arranged to define a holding area; and at least one battery arranged in the holding area and secured by the holding clamps.

12. The vehicle as claimed in claim 11, wherein the holding clamps are attached to the rear floor at fixing points that are varied in a vehicle longitudinal and transverse direction.

13. The vehicle as claimed in claim 11, wherein the battery is inseparably connected to the holder.

14. The vehicle as claimed in claim 11 further comprising a support arranged between the battery and the rear floor where the holder is attached.

15. The vehicle as claimed in claim 11, wherein the rear slanted edge tapers in a direction of ground.

\* \* \* \* \*